United States Patent
Zhou et al.

(10) Patent No.: US 12,100,856 B2
(45) Date of Patent: Sep. 24, 2024

(54) BATTERY THERMAL OVERLOAD PROTECTION SYSTEM

(71) Applicant: FORD GLOBAL TECHNOLOGIES, LLC, Dearborn, MI (US)

(72) Inventors: Qian Zhou, Northville, MI (US); Kent Snyder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 18/151,136

(22) Filed: Jan. 6, 2023

(65) Prior Publication Data
US 2024/0234938 A1 Jul. 11, 2024

(51) Int. Cl.
| | |
|---|---|
| H01M 10/647 | (2014.01) |
| B60L 50/64 | (2019.01) |
| H01M 10/48 | (2006.01) |
| H01M 50/242 | (2021.01) |
| H01M 50/264 | (2021.01) |
| H01M 50/383 | (2021.01) |
| H02H 5/04 | (2006.01) |

(52) U.S. Cl.
CPC ........... *H01M 50/383* (2021.01); *B60L 50/64* (2019.02); *H01M 10/486* (2013.01); *H01M 50/242* (2021.01); *H01M 50/264* (2021.01); *H02H 5/04* (2013.01); *H01M 2220/20* (2013.01)

(58) Field of Classification Search
CPC ............................ H01M 50/383; H01M 50/39
See application file for complete search history.

(56) References Cited

U.S. PATENT DOCUMENTS

| | | | |
|---|---|---|---|
| 7,764,047 B2 | 7/2010 | Jeon et al. | |
| 8,802,260 B2 | 8/2014 | Nakanishi et al. | |
| 9,221,343 B2 | 12/2015 | Tokarz et al. | |
| 10,665,833 B2 | 5/2020 | Dekeuster et al. | |
| 10,804,577 B2 | 10/2020 | King et al. | |
| 10,873,111 B2 * | 12/2020 | Melack | C09D 7/00 |
| 2023/0344058 A1 * | 10/2023 | Salter | H01M 50/249 |

FOREIGN PATENT DOCUMENTS

| | | |
|---|---|---|
| EP | 2996134 A1 | 3/2016 |
| KR | 102262201 B1 | 6/2021 |
| WO | 2007096335 A1 | 8/2007 |

* cited by examiner

*Primary Examiner* — Jared Fureman
*Assistant Examiner* — Esayas G Yeshaw
(74) *Attorney, Agent, or Firm* — David B Kelley; Brooks Kushman. P.C.

(57) ABSTRACT

A vehicle includes an electric machine, a battery, a clamping fixture, and blades. The battery has a plurality of cells configured to deliver power to the electric machine. The clamping fixture has plates disposed on opposing ends of the plurality of cells and members secured to each of the plates. The members are secured to the plates under a tension force such that the plates apply a compression force to the plurality of cells to decrease the internal resistance of the plurality of cells. The blades are configured to sever the members to release the compression force to increase the internal resistance of the array of cells in response to a temperature of at least one cell of the array of cells exceeding a threshold.

20 Claims, 4 Drawing Sheets

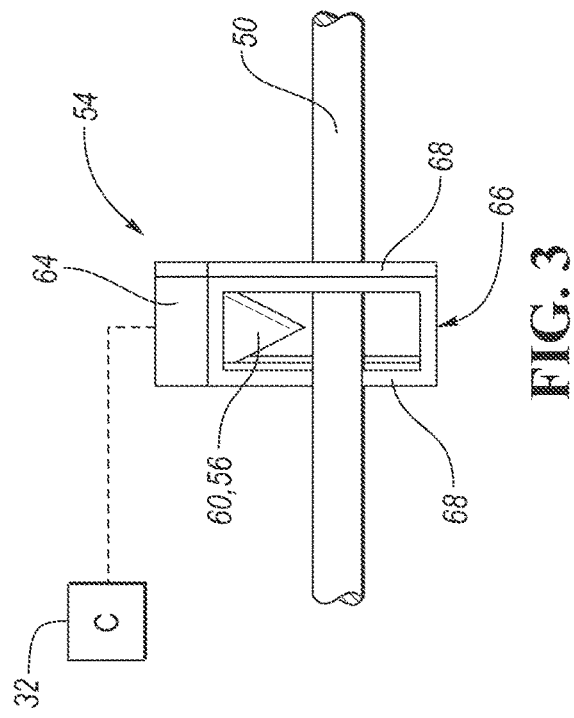
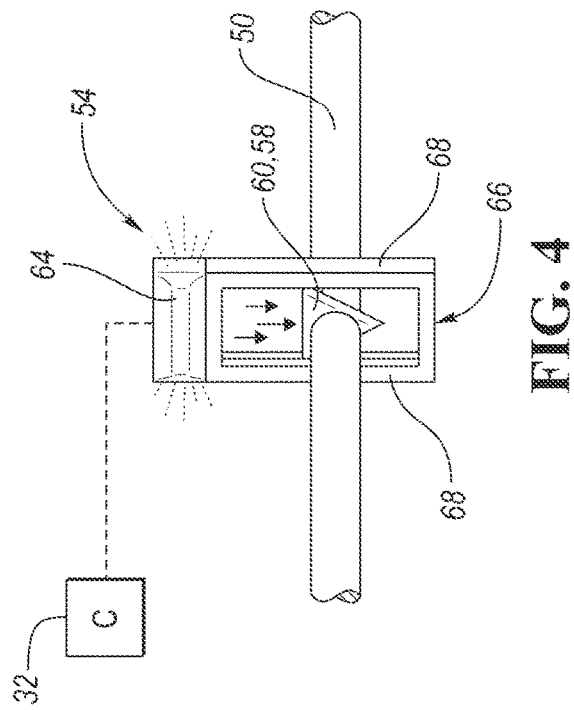
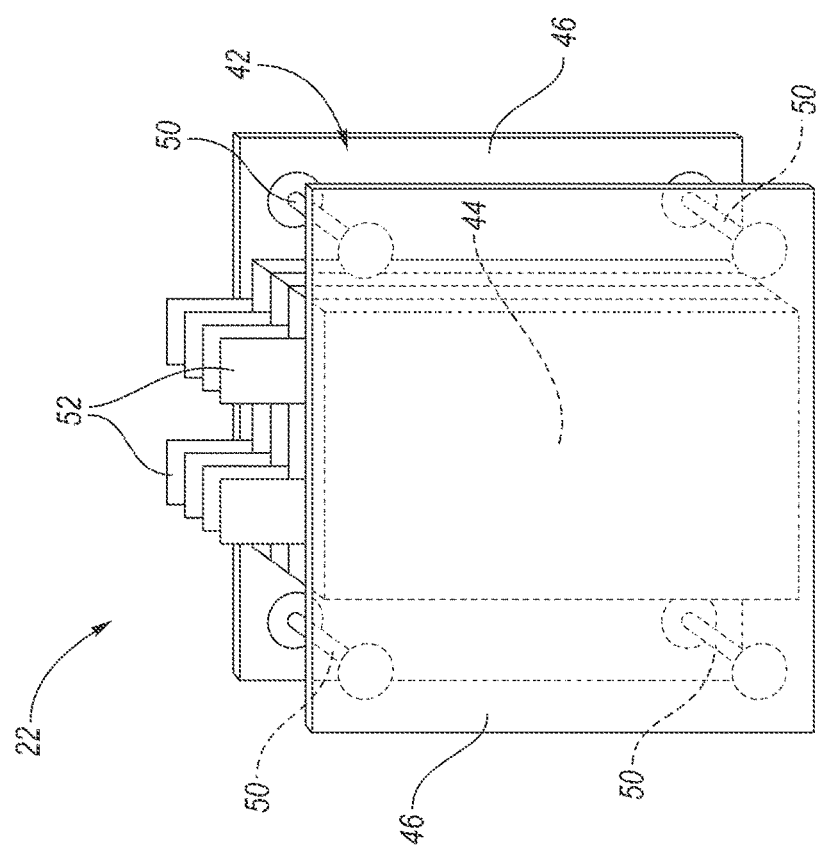

BATTERY THERMAL OVERLOAD PROTECTION SYSTEM

TECHNICAL FIELD

The present disclosure relates to hybrid/electric vehicles and batteries for hybrid/electric vehicles.

BACKGROUND

Hybrid/electric vehicles may be propelled by an electric machine that draws power from a battery.

SUMMARY

A vehicle includes an electric machine, a battery, a fixture, and blades. The electric machine is configured to propel the vehicle. The battery has an array of cells and is configured to deliver power to the electric machine. The fixture has first and second plates disposed on opposing ends of the array of cells and rods secured to each of the first and second plates. The rods are secured to the first and second plates under a tension force such that the first and second plates apply a compression force to the array of cells to decrease the internal resistance of the array of cells. The blades are disposed adjacent to the rods and are configured to engage and sever the rods to release the compression force to increase the internal resistance of the array of cells.

A vehicle includes an electric machine, a battery, a clamping fixture, and blades. The battery has a plurality of cells configured to deliver power to the electric machine. The clamping fixture has plates disposed on opposing ends of the plurality of cells and members secured to each of the plates. The members are secured to the plates under a tension force such that the plates apply a compression force to the plurality of cells to decrease the internal resistance of the plurality of cells. The blades are configured to sever the members to release the compression force to increase the internal resistance of the array of cells in response to a temperature of at least one cell of the array of cells exceeding a threshold.

A vehicle includes an electric machine, a battery, a fixture, a blade, and a controller. The battery has an array of cells configured to deliver power to the electric machine. The fixture has opposing plates compressing the array of cells to decrease the internal resistance of the plurality of cells and a tension member secured to each of the opposing plates under a tension force such that the opposing plates apply a compression force to the array of cells. The blade is disposed adjacent to the tension member. The controller is programmed to, in response to a temperature of at least one cell of the array of cells exceeding a threshold, advance the blade to engage and sever the tension member.

BRIEF DESCRIPTION OF THE DRAWINGS

FIG. 2 is a schematic illustration of an array of battery cells and a corresponding clamping fixture;

FIG. 3 is a magnified schematic illustration of a tension member of the clamping fixture and a corresponding severing device in a deactivated condition;

FIG. 4 is a magnified schematic illustration of the tension member of the clamping fixture and the corresponding severing device in an activated condition;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
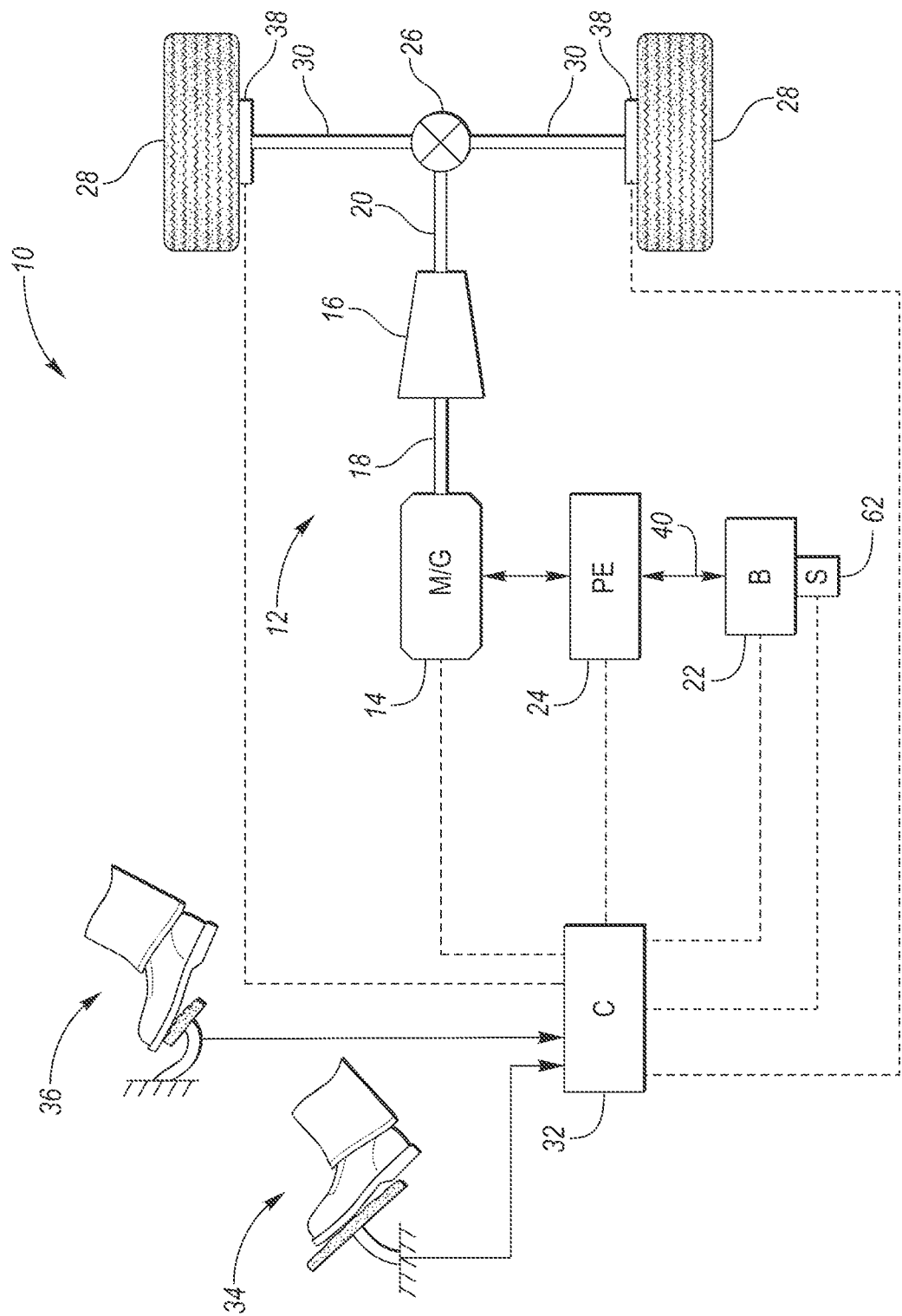
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for case of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/ exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component amount, percentage, or presence, intake air flow (MAF), etc.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

Referring to FIGS. 2, the battery 22 and a corresponding compression or clamping fixture 42 are illustrated. The battery 22 include a plurality of cells or an array of cells 44. The clamping fixture 42 includes opposing plates 46 disposed on opposing ends of the array of cells 44. The opposing plates 46 may be referred to as the first and second plates. The opposing plates 46 are configured to compress the array of cells 44 to decrease the internal resistance of the cells 44. Rods or tension members 50 are secured to each of the opposing plates 46 under a tensions force, pulling the plates 46 toward each other such that the plates 46 apply a compression force to the array of cells 44 to decrease the internal resistance of the cells 44. The tension members 50 may be secured to the opposing plates 46 in any desirable manner. For example, the tension members 50 may include threading that engages tapped orifices defined by the opposing plates 46 or that engages threaded nuts to pull the opposing plates 46 toward each other to generate the compression force applied to the array of cells 44.

Battery compression fixtures (e.g., clamping fixture 42) utilize structural tension elements in conjunction with planar end elements to hold single or stacked multiple battery cells under a compression force or to prohibit expansion within a fixed thickness or length, which reduces battery cell internal delamination and maintains active material particle-to-particle contact which are essential to maintaining battery cell capacity, functional internal cell resistance, and optimal heat transfer contact in providing maximum battery life. This is advantageous for solid-state type batteries but also may be advantageous for liquid electrolyte Lithium-ion type batteries or other types of batteries. The compression fixtures also may help in maintaining alignment of the cell terminals 52 and busbars and may provide mechanical retention of cells during environmental exposure to shock and vibration. Also, continuously applied pressure to the cells may be necessary to maintain acceptably low internal resistance and achieve useful life during normal operation of the battery.

Referring now to FIGS. 3-4, one of the tension members 50 of the clamping fixture 42 and a corresponding severing device 54 are illustrated. The severing device is illustrated in a deactivated condition in FIG. 3 and an activated condition in FIG. 4. It should be understood that the tension member 50 illustrated in FIGS. 3 and 4 may be representative of each of the tension members 50. It should be further understood that each tension member 50 may have a corresponding severing device 54 and the that the severing device 54 illustrated in FIGS. 3 and 4 may be representative of each severing device 54. The severing device 54 includes a blade 60 that is disposed adjacent to the tension member 50. Upon activation, the blade 60 is configured to transition from a deactivated position or condition 56 to an activated position or condition 58 to engage and sever the tension member 50 to release the compression force being applied to the array of cells 44 via the opposing plates 46 in order to increase the internal resistance of the array of cells 44.

The blade 60 is configured to transition from the deactivated condition 56 to the activated condition 58 in response to a temperature of at least one cell of the array of cells 44 exceeding a threshold. More specifically, the controller 32 may be programmed to, in response to a temperature of at least one cell of the array of cells 44 exceeding the threshold, advance the blade 60 to engage and sever the tension member 50. Once or more temperature sensors 62 may be configured to relay the temperature of one or more of the cells of the array of cells 44 to the controller 32 (e.g., FIG. 1).

Releasing the applied compression force on the array of cells 44 results in a corresponding increase in the internal resistance of the cells 44. When a solid-state battery (e.g., battery 22) is in an abuse condition, releasing the compression force applied to the stack or array of cells of the battery, and therefore increasing the internal resistance of the stack or array of cells of the battery, may prevent or significantly delay a thermal event.

The severing device 54 may include an actuator 64 configured to advance the blade 60 to engage and sever the tension member 50. The controller 32 may be in communication with the actuator 64 and may be programmed to, in response to the temperature of at least one cell of the array of cells 44 exceeding the threshold, activate the actuator 64 to advance the blade 60 to engage and sever the tension member 50. The actuators 64 could be electric solenoids, hydraulic cylinders, pneumatic cylinders, electric motors, or may be an explosive or pyrotechnic device that advances the blade 60 upon activation.

Figure 5:
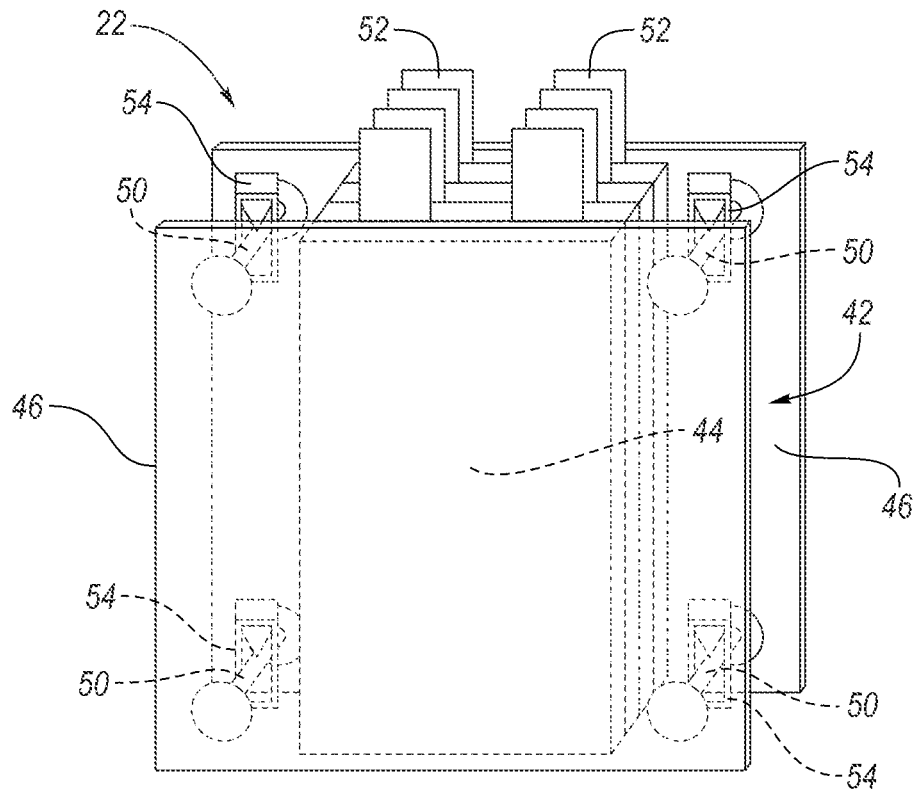
FIG. 5 is a schematic illustration of the array of battery cells, the corresponding clamping fixture, and a first configuration of a plurality of the severing devices.
Figure 6:
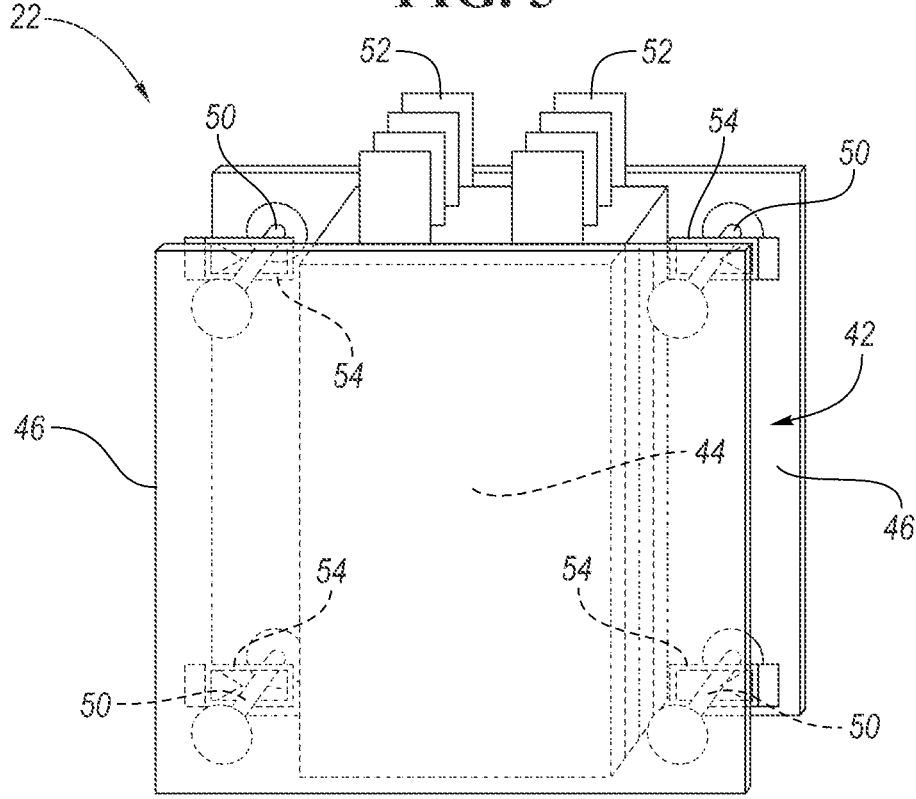
FIG. 6 is a schematic illustration of the array of battery cells, the corresponding clamping fixture, and a second configuration of the plurality of the severing devices.

The severing device 54 may include a frame 66 disposed about the tension member 50. The blade 60 and the actuator 64 may be coupled to the frame 66. The blade 60 may more specifically be slidably secured to the frame 66. The frame 66 may include rails 68 that are configured to guide the blade 60 toward the tension member 50 while the blade 60 is transitioning from the deactivated condition 56 to the activated condition 58 to engage and sever the tension member 50. The actuator 64 may be disposed along a distal end of the rails 68. The severing device 54, or more specifically the frame 66, may be secured directly to the tension member 50. The blades 60 of the severing device 54 may be guided vertically as illustrated in FIG. 5, may be guided horizontally as illustrated in FIG. 6, or may be guided in any desirable direction.

Figure 7:
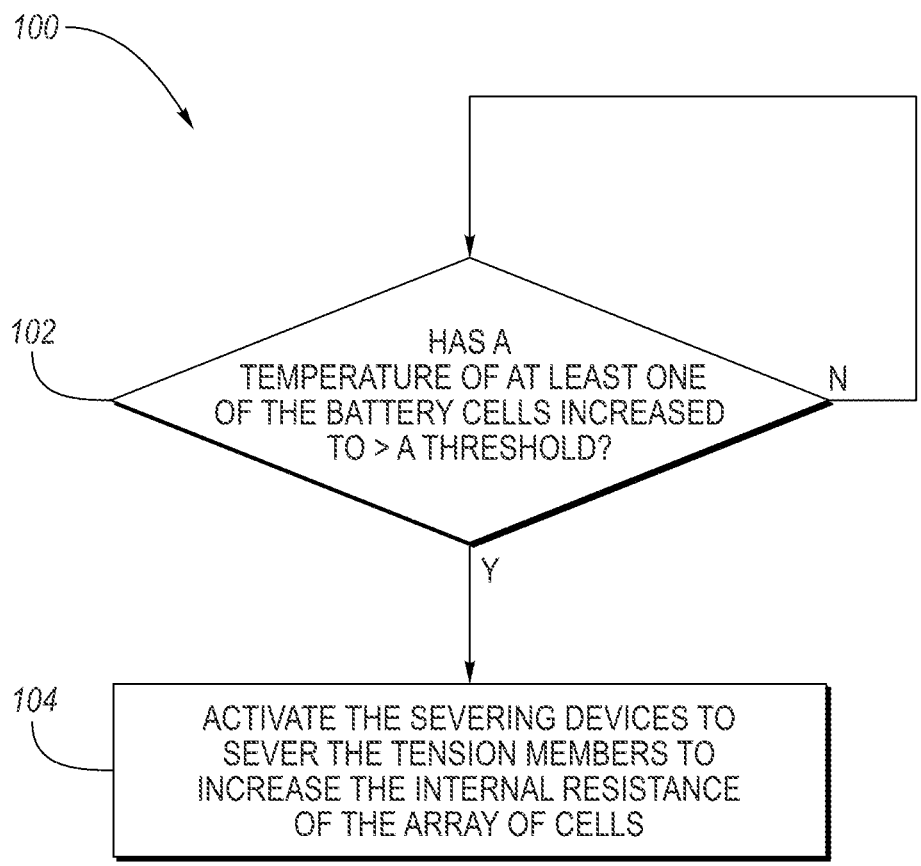
FIG. 7 is a flowchart illustrating a method for controlling the severing devices.

Referring to FIG. 7, flowchart of a method 100 for controlling the severing devices 54 is illustrated. The method 100 may be stored as control logic and/or an algorithm within the controller 32. The controller 32 may implement the method 100 by activating the severing devices 54 or more specifically by activating the actuators 64. The method 100 begins at block 102, where it is determined if a temperature of at least one of the battery cells of the array of cells 44 has increased to greater than a threshold. If the temperature of at least one of the battery cells of the array of cells 44 has not increased to greater than a threshold, the method 100 recycles back to the beginning of block 102. If the temperature of at least one of the battery cells of the array of cells 44 has increased to greater than a threshold, the method 100 moves on to block 102 where the severing devices 54, or more specifically the actuators 64, are activated to advance the blades 60 to engage and sever the tension members 50 to increase the internal resistance of the cells 44 to prevent a thermal event.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine configured to propel the vehicle;
   a battery (i) having an array of cells and (ii) configured to deliver power to the electric machine;
   a fixture having (i) first and second plates disposed on opposing ends of the array of cells and (ii) rods secured to each of the first and second plates, wherein the rods are secured to the first and second plates under a tension force such that the first and second plates apply a compression force to the array of cells to decrease an internal resistance of the array of cells; and
   blades (i) disposed adjacent to the rods and (ii) configured to engage and sever the rods to release the compression force to increase the internal resistance of the array of cells.

2. The vehicle of claim 1 further comprising actuators configured to advance the blades toward the rods.

3. The vehicle of claim 2 further comprising a controller, wherein the controller is programmed to, in response to a temperature of at least one cell of the array of cells exceeding a threshold, activate the actuators to advance the blades to engage and sever the rods.

4. The vehicle of claim 2, wherein the actuators include pyrotechnics.

5. The vehicle of claim 2 further comprising frames disposed about the rods, wherein the blades and the actuators are coupled to the frames.

6. The vehicle of claim 5, wherein the frames include rails that are configured to guide the blades toward the rods.

7. The vehicle of claim 6, wherein the actuators are disposed along an end of the rails.

8. A vehicle comprising:
   an electric machine;
   a battery having a plurality of cells configured to deliver power to the electric machine;
   a clamping fixture having (i) plates disposed on opposing ends of the plurality of cells and (ii) members secured to each of the plates, wherein the members are secured to the plates under a tension force such that the plates apply a compression force to the plurality of cells to decrease an internal resistance of the plurality of cells; and
   blades configured to sever the members to release the compression force to increase the internal resistance of the plurality of cells in response to a temperature of at least one cell of the plurality of cells exceeding a threshold.

9. The vehicle of claim 8 further comprising actuators configured to advance the blades toward the members.

10. The vehicle of claim 9 further comprising a controller, wherein the controller is programmed to, in response to a temperature of at least one cell of the plurality of cells exceeding a threshold, activate the actuators to advance the blades to engage and sever the members.

11. The vehicle of claim 9, wherein the actuators include pyrotechnics.

12. The vehicle of claim 9 further comprising frames disposed about the members, wherein the blades and the actuators are coupled to the frames.

13. The vehicle of claim 12 wherein the frames include rails that are configured to guide the blades toward the members.

14. The vehicle of claim 13, wherein the actuators are disposed along an end of the rails.

15. A vehicle comprising:
an electric machine;
a battery having an array of cells configured to deliver power to the electric machine;
a fixture having (i) opposing plates compressing the array of cells to decrease an internal resistance of the array of cells and (ii) a tension member secured to each of the opposing plates under a tension force such that the opposing plates apply a compression force to the array of cells;
a blade disposed adjacent to the tension member; and
a controller programmed to, in response to a temperature of at least one cell of the array of cells exceeding a threshold, advance the blade to engage and sever the tension member.

16. The vehicle of claim 15 further comprising an actuator configured to advance the blade toward the tension member.

17. The vehicle of claim 16, wherein the actuator includes pyrotechnics.

18. The vehicle of claim 16 further comprising a frame disposed about the tension member, wherein the blade and the actuator are coupled to the frame.

19. The vehicle of claim 18 wherein the frame includes rails that are configured to guide the blade toward the tension member.

20. The vehicle of claim 19, wherein the actuator is disposed along an end of the rails.

* * * * *